United States Patent
Li et al.

(10) Patent No.: US 12,476,510 B2
(45) Date of Patent: Nov. 18, 2025

(54) STATOR MECHANISM FOR MAGNETIC LEVITATION MOTOR, AND STATOR COIL

(71) Applicant: MAGASSIST INC., Suzhou (CN)

(72) Inventors: Yingnan Li, Suzhou (CN); Ifan Yen, Suzhou (CN)

(73) Assignee: Magassist Inc., Suzhou (CN)

( * ) Notice: Subject to any disclaimer, the term of this patent is extended or adjusted under 35 U.S.C. 154(b) by 314 days.

(21) Appl. No.: 18/036,763

(22) PCT Filed: Nov. 16, 2021

(86) PCT No.: PCT/CN2021/130958
§ 371 (c)(1),
(2) Date: May 12, 2023

(87) PCT Pub. No.: WO2022/100757
PCT Pub. Date: May 19, 2022

(65) Prior Publication Data
US 2025/0266728 A1  Aug. 21, 2025

(30) Foreign Application Priority Data
Nov. 16, 2020 (CN) .......................... 202022640974.X

(51) Int. Cl.
*H02K 3/34* (2006.01)
*H02K 1/14* (2006.01)

(52) U.S. Cl.
CPC ............. *H02K 3/345* (2013.01); *H02K 1/146* (2013.01); *H02K 2203/12* (2013.01)

(58) Field of Classification Search
CPC ..... H02K 1/146; H02K 3/345; H02K 2203/12
(Continued)

(56) References Cited

U.S. PATENT DOCUMENTS 4,714,850 A * 12/1987 Akiba .................. H02K 5/1672
310/43
4,944,748 A    7/1990 Bramm et al.
(Continued)

FOREIGN PATENT DOCUMENTS

CN    102239623 A    11/2011
CN    106575898 A    4/2017
(Continued)

OTHER PUBLICATIONS

Extended European Search Report issued on Oct. 4, 2024 for counterpart European patent application No. 21891277.2 (6 pages).
(Continued)

*Primary Examiner* — Rashad H Johnson
(74) *Attorney, Agent, or Firm* — Nutter McClennen & Fish LLP

(57) ABSTRACT

A stator mechanism for a magnetic levitation motor and a stator coil. The stator mechanism includes a stator coil and a stator core. The stator core includes a stator yoke and at least one pair of stator teeth (31). Each of the stator teeth (31) includes a vertical section (311) contacted with the stator yoke and a transverse section (312) at a predetermined angle with the vertical section (311). The stator coil includes an insulating framework (1) and a coil (4). The insulating framework (1) includes an insulating body (11) disposed on an outer surface of the vertical section (311). The insulating body (11) has a first end and a second end opposite to each other in a first extending direction. The first end is provided with a first baffle (12), and the second end is provided with a second baffle (17). The insulating body (11) has a first main surface (111) and a second main surface (112) opposite to each other. The second main surface (112) is a cambered surface protruding outwards away from the first main surface (111). The coil (4) is transversely wound on the first main surface (111) and the second main surface (112) and (Continued)

tightly attached thereto. When a cross-section of the wound coils is of specific shape, coils can be stacked to a maximum density in a limited space.

10 Claims, 4 Drawing Sheets

(58) Field of Classification Search
USPC .................................................... 310/254.1
See application file for complete search history.

(56) References Cited

U.S. PATENT DOCUMENTS

| | | | | |
|---|---|---|---|---|
| 2011/0176229 | A1* | 7/2011 | Saito | G02B 7/102 |
| | | | | 318/400.13 |
| 2013/0307454 | A1* | 11/2013 | Hioki | H02P 8/12 |
| | | | | 318/400.34 |
| 2022/0388598 | A1* | 12/2022 | Lee | H02K 3/28 |
| 2022/0388599 | A1* | 12/2022 | Lee | H02K 1/146 |

FOREIGN PATENT DOCUMENTS

| | | |
|---|---|---|
| CN | 107302294 A | 10/2017 |
| CN | 111561519 A | 8/2020 |
| CN | 112421811 A | 2/2021 |
| CN | 112421909 A | 2/2021 |
| CN | 213402592 U | 6/2021 |
| JP | 2016082624 A | 5/2016 |
| WO | 2014180875 A2 | 11/2014 |

OTHER PUBLICATIONS

International search report for Chinese patent application No. PCT/CN2021/130958 mailed on Feb. 11, 2022 (3 pages).

Decision on the Examination of a Request for Invalidation issued on Mar. 30, 2023 for counterpart Chinese patent application No. 202022640974.X, along with machine EN translation (12 pages).

Notice of Acceptance of Invalidation Request issued on Sep. 30, 2022 for counterpart Chinese patent application No. 202022640974.X, along with machine EN translation (61 pages).

* cited by examiner

STATOR MECHANISM FOR MAGNETIC LEVITATION MOTOR, AND STATOR COIL

CROSS-REFERENCE TO RELATED APPLICATIONS

The present disclosure claims priority to Chinese Patent Application No. 202022640974.X, entitled 'stator mechanism for magnetic levitation motor, and stator coil'.

TECHNICAL FIELD

The present disclosure relates to a field of medical devices, and particularly to a stator mechanism for a magnetic levitation motor, and a stator coil.

BACKGROUND

When the heart fails to pump blood, for example in a case of cardiac arrest surgery, or acute cardiogenic shock, etc., a blood pump may be adopted to replace the heart to assist the maintenance of human blood circulation.

The blood pump usually includes a magnetic levitation motor, a pump head, a pipeline, etc. An impeller is disposed inside the pump head, the motor is configured to drive the impeller to rotate, and the pipeline is configured to realize blood communication between the pump head and a patient. The magnetic levitation motor drives the impeller in the pump head to rotate by means of magnetic coupling, and the impeller promotes the flow of blood by rotation or any other mechanical movement capable of pushing the liquid, thereby assisting or replacing the heart to maintain the blood circulation. The motor is a reusable device, while the pump head and the pipeline contacted with blood are disposable articles and need to be replaced with new ones each time they are used.

In the prior art, as illustrated in FIG. 1, there is no physical contact between the rotor 22 and the stator mechanism of the magnetic levitation motor as compared to a conventional motor, and there may be a large clearance between the rotor 22 and the stator mechanism, which makes the magnetic levitation motor have significant advantages. On the one hand, the absence of physical contact eliminates the mechanical wear of the components of the magnetic levitation motor. On the other hand, the large clearance allows the fluid flowing through the clearance to experience less shear stress, which is beneficial to reducing the damage to blood cells and improving the compatibility of blood.

The stator mechanism generally includes an annular stator yoke 21 and a plurality of stator teeth 211 arranged on the stator yoke 21 in a circumferential direction. Both the stator tooth 211 and the rotor 22 are made of a magnetically conductive material. The stator tooth 211 includes a vertical portion and a horizontal portion perpendicular to each other in an inverted 'L' shape. A copper coil 212 is wound on the vertical portion to provide a radial electromagnetic force to the rotor 22 so as to levitate the rotor 22.

For a winding cross-section with a specific shape, the coil winding design at present is generally made arbitrarily under human experiences, without completely and fully utilizing the space between the rotor and the stator teeth. If the windings are too saturated, the coil, when squeezed by a motor housing, will cause a poor contact between the stator teeth and the stator yoke and an air gap between the two, resulting in uneven magnetic flux. If the windings have too small turns, it is impossible to obtain the ampere-turns required to generate a sufficient magnetic field. Therefore, for the specially-shaped stator teeth and the compact structure, how to wind the coil to the greatest extent in a limited space is a problem urgently to be solved.

It should be noted that the above introduction to the technical background is only for the convenience of clearly and completely explaining the technical solutions of the utility model and facilitating the understanding by those skilled in the art. It cannot be considered that the above technical solutions are well known to those skilled in the art just because they are described in the background section of the utility model.

SUMMARY

In order to overcome at least one technical problem existed in the prior art, the present disclosure provides a stator mechanism for a magnetic levitation motor, and a stator coil, which enable a maximum density of stacked coils in a limited space in a case where the cross-section of the wound coils is of specific shape.

In order to achieve the above objective, the technical solutions of the present disclosure are given as follows:

The present disclosure discloses a stator mechanism for a magnetic levitation motor, including a stator coil and a stator core.

The stator core includes a stator yoke and at least a pair of stator teeth, and each of the stator teeth includes a vertical section contacted with the stator yoke. The stator yoke is an annular structure with an annular inner circumferential surface. The vertical section includes a third main surface which is a cambered structure close to the annular inner circumferential surface.

The stator coil includes an insulating framework and a coil. The insulating framework includes an insulating body disposed on an outer surface of the vertical section, and the insulating body has a first main surface and a second main surface opposite to each other. The first main surface is a straight surface close to the third main surface. The second main surface is a cambered surface protruding outwards away from the first main surface, and the coil is transversely wound on the first main surface and the second main surface and tightly attached thereto.

Compared with the prior art, the present disclosure has the following advantageous effects.

The embodiments of the present disclosure provide a stator mechanism for a magnetic levitation motor and a stator coil. The stator mechanism includes a stator coil and a stator core. The stator core includes a stator yoke and stator teeth. Since some magnetic paths need to adopt an axial structure, the stator tooth part is designed as a radial structure with a vertical section and a transverse section to levitate a rotor in the magnetic levitation motor. The vertical section of the stator tooth is equipped with a coil and is spaced from the coils by an insulating body.

The insulating framework has a cambered structure, and the cambered surface can make the space more compact. Meanwhile, the coil can be tightly attached to the first main surface and the second main surface when wound thereon, so that the coil is tightly attached to the surface of the framework, and the coil is not prone to breakage, uneven alignment, wire staggering, or layer staggering.

REFERENCE NUMERALS

Figure 1:
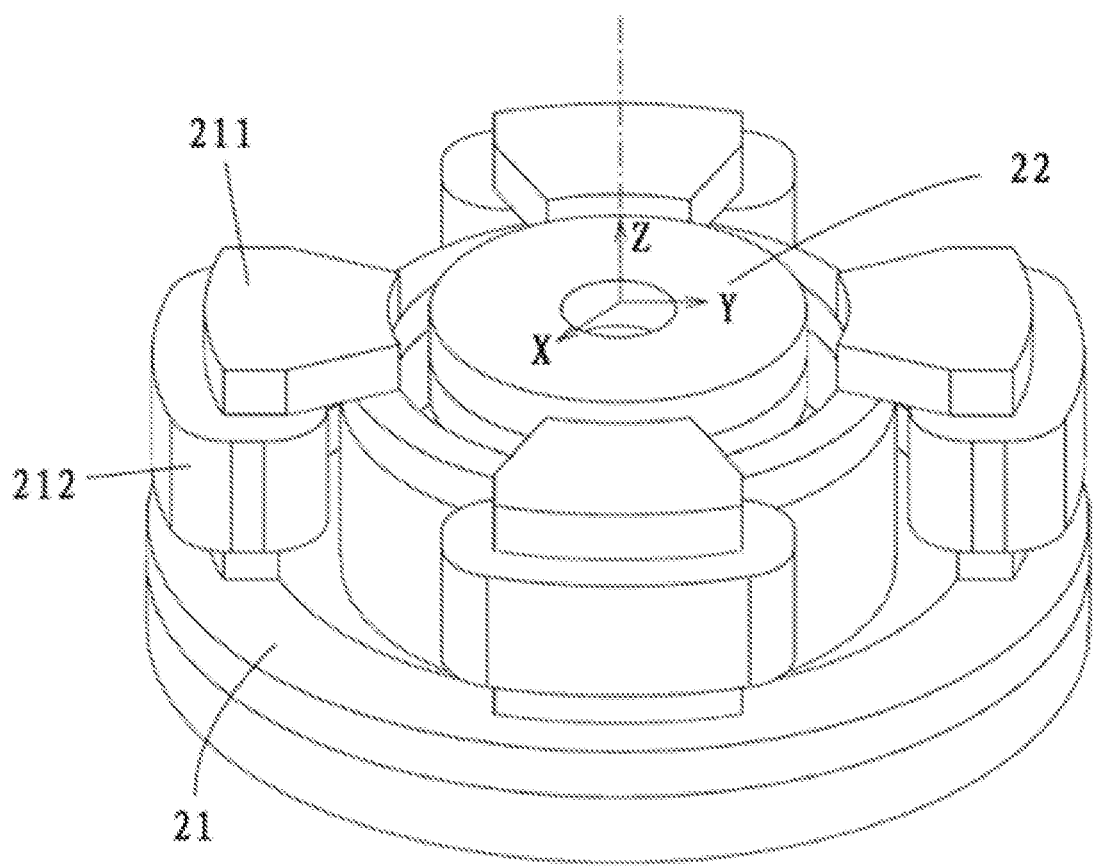
FIG. 1 illustrates a structural diagram of a magnetic levitation motor in the prior art.

1: insulating framework; 11: insulating body; 111: first main surface; 112: second main surface; 12: first baffle; 121: wire entry slot; 13: first side edge; 14: second side edge; 15: third side edge; 16: fourth side edge; 17: second baffle; 31: stator tooth; 311: vertical section; 312: transverse section; 313: third main surface; 314: fourth main surface; 4: coil.

DETAILED DESCRIPTION

For a further illustration of the technical features adopted by the present disclosure to achieve the intended invention objectives and effects, the specific implementations, structures, features and effects according to the present disclosure are described in detail as follows with reference to the drawings and the exemplary embodiments.

A stator mechanism for a magnetic levitation motor and a stator coil according to the embodiments of the utility model will be described and illustrated below with reference to FIGS. 1 to 5. It should be noted that, for the convenience of explanation, like reference numerals denote like components in the embodiments of the present disclosure. For the sake of brevity, repeated descriptions of like components are omitted in different embodiments, and such descriptions can be referenced and cited to each other.

An embodiment of the present disclosure provides a stator mechanism for a magnetic levitation motor including a stator coil and a stator core. The stator core includes a stator yoke and at least a pair of stator teeth 31. Each of the stator teeth 31 includes a vertical section 311 contacted with the stator yok and a transverse section 312 at a predetermined angle with the vertical section 311. The stator coil includes an insulating framework 1 and a coil 4. The insulating framework 1 includes an insulating body 11 disposed on an outer surface of the vertical section 311. The insulating body 11 has a first end and a second end opposite to each other in a first extending direction. The first end is provided with a first baffle 12, and the second end is provided with a second baffle 17. The insulating body 11 has a first main surface 111 and a second main surface 112 opposite to each other. The second main surface 112 is a cambered surface protruding outwards away from the first main surface 111. The coil 4 is transversely wound on the first main surface 111 and the second main surface 112 and tightly attached thereto.

The magnetic levitation motor may be used as a power source of a driving device of household appliances, medical devices and the like. The magnetic levitation motor includes a stator mechanism fixed in a motor housing (not illustrated) and a rotor floated and rotary relative to the stator mechanism. The rotor is levitatable in a radial plane of the stator mechanism under an electromagnetic field generated by the stator mechanism.

Specifically, the stator core may be made of a magnetically conductive material. In the stator mechanism according to the embodiment of the present disclosure, the stator core may include a stator yoke and stator teeth 31. The stator yoke may be a substantially annular structure having a certain height, with an upper surface for mounting the stator teeth 31. In this way, a clearance or an air gap is formed between the rotor and the stator teeth 31. It should be noted that the annular structure is not limited to a circular ring structure, and may also be an elliptical ring structure or a square structure. The annular structure is essentially a circumferential structure.

Figure 3:
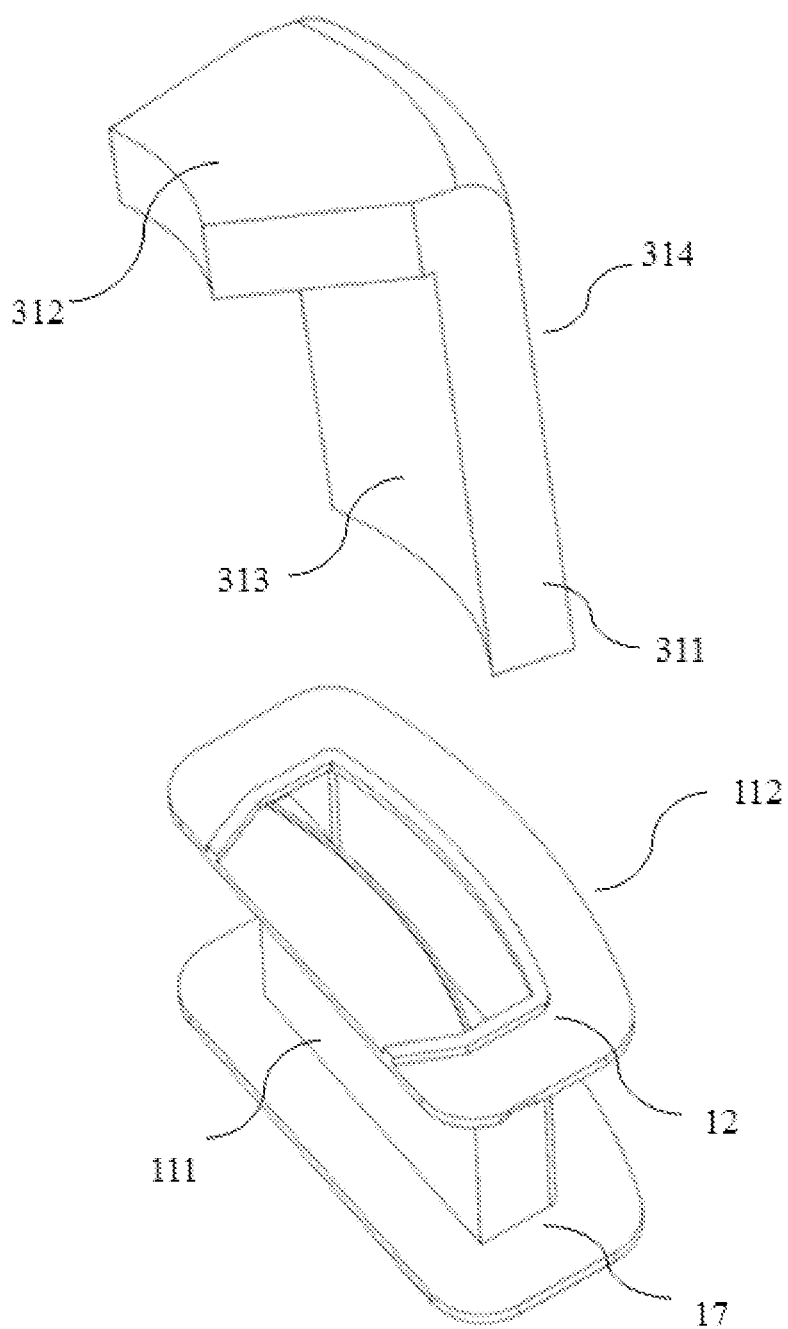
FIG. 3 illustrates an exploded view of FIG. 2.

The stator teeth 31 are arranged along the circumferential direction of the stator yoke. As illustrated in FIG. 3, the stator tooth 31 may include a vertical section 311 contacted with the annular structure and a transverse section 312 at a predetermined angle with the vertical section 311. The vertical section 311 is longitudinally mounted on the stator yoke along a central axis of the annular structure. The vertical section 311 has two opposite ends along its longitudinal extending direction, one end of which is contacted with the stator yoke, and the other end of which is extended out of the transverse section 312 towards a radial inner side of the stator yoke. The transverse section 312 may be flush with a surface of the rotor.

Further, the stator tooth 31 is overall L-shaped, and the coil 4 is wound on the vertical section 311 of the stator tooth 31 to generate a magnetic flux along an axial direction of the annular structure. A radial magnetic path of the transverse section 312 directly acts on a rotor in the motor, and adjusts the position of the rotor in real time by coupling with the rotor. The predetermined angle between the vertical section 311 and the transverse section 312 is 90°, i.e., they are perpendicular to each other. Of course, in some other possible embodiments, there may be any other angle between the vertical section 311 and the transverse section 312, so that the transverse section 312 is extended obliquely relative to a horizontal direction perpendicular to the vertical direction.

In the embodiment of the present disclosure, the coils 4 on each pair of stator teeth 31 may generate electromagnetic forces in a same direction or opposite directions on the rotor. For example, under an ideal condition that the rotor is stably levitated, the coils 4 wound on each pair of stator teeth 31 may generate electromagnetic forces in opposite directions on the rotor, so that the rotor can be stably levitated in a radial plane. The coil 4 consists of a conductor and an insulating layer wrapping the conductor. The conductor may be a copper wire or any 30 other electrically conductive material.

There are at least one pair of stator teeth 31, and two stator teeth in each pair of stator teeth 31 are arranged opposite to each other in a radial direction. The specific number of pairs of the stator teeth 31 may be set as needed, and is not particularly limited herein. The stator tooth 31 is wound by the coil 4 and is spaced from the coils 4 by the insulating framework 1. Therefore, the insulating framework 1 and the stator tooth 31 may be in a nested arrangement. The insulating framework 1 is made of an insulating material, which is not specifically limited.

The annular structure of the stator yoke has an annular inner circumferential surface. The vertical section 311 of the stator tooth 31 includes a third main surface 313 close to and flush with the annular inner circumferential surface. A curvature of the third main surface 313 is the same as that of the annular inner circumferential surface.

The vertical section 311 further includes a fourth main surface 314 opposite to the third main surface 313. The third main surface 313 and the fourth main surface 314 are both concentric cambered structures.

In the embodiment of the present disclosure, the stator yoke is vertically connected to the stator tooth 31. In order to avoid the loss of the magnetic field at a junction of the stator yoke and the stator tooth 31 so that the magnetic field can be better transferred among ferromagnetic elements, a surface of the vertical section 311 of the stator tooth 31 facing the annular inner circumferential surface is designed as a cambered surface with a same curvature as the stator yoke. When the stator tooth 31 is mounted on the stator yoke, the third main surface 313 of the stator tooth 31 may be flush with the annular inner circumferential surface. Exemplarily, in order that the magnetic path on the vertical section 311 is uniform, the thicknesses of any two points of the vertical section 311 are equal. The third main surface 313 and the fourth main surface 314 of the vertical section 311 are two concentric cambered structures. Both the third main surface 313 and the fourth main surface 314 are curved towards the annular inner circumferential surface of the yoke.

The rotor interacts with the stator through a magnetic field, the magnetic field is radiated outwards from a magnetic source. Therefore, the inner surface of the stator tooth 31, i.e., the third main surface 313, is designed as a cambered surface, which can achieve the uniform distribution of the magnetic field, and significantly influence the magnetic levitation structure under high-precision control, thereby improving the radial control stiffness.

The vertical section 311 of the stator tooth 31 is overall a cambered strip structure. Corresponding to the structure of the stator tooth 31, as illustrated in FIG. 3, the side surfaces of the insulating body 11 wrap the vertical section 311 of the stator tooth 31, and include a first main surface 111 and a second main surface 112 opposite to each other, and other two main surfaces opposite to each other. At least the second main surface 112 is a cambered surface.

In the stator mechanism according to the embodiment of the present disclosure, the first main surface 111 and the second main surface 112 of the insulating body 11 are located between the first baffle plate 12 and the second baffle plate 17, and are two main surfaces located in the radial direction of the stator yoke for being transversely wound by the coils 4. The coils 4 are wound on the first main surface 111 and the second main surface 112 and tightly attached thereto. In order that the coil 4 is tightly attached to the first main surface 111, the first main surface 111 may be a cambered surface protruding outwards away from the second main surface 112, and may also be a straight surface. Exemplarily, the first main surface 111 is a straight surface, so that the coil 4 is not prone to breakage, uneven alignment or layer staggering when winding on the straight surface. The second main surface 112 is a cambered surface protruding outwards away from the first main surface 111, so that the motor structure is more compact when a housing is mounted outside the stator mechanism, and there is no extra clearance. A curvature of the second main surface 112 is the same as that of the fourth main surface 314.

Further, as described above, the straight surface construction of the first main surface 111 enables the coil 4 to be tightly contacted with the first main surface 111, which avoids an air gap from being formed between the coil 4 and the first main surface 111, thereby reducing the energy loss and increasing the energy density.

When the insulating framework 1 is manufactured on the vertical section 311 of the stator tooth 31, in order that the overall structure of the stator mechanism is more compact, a curvature of the second main surface 112 of the insulating body 11 is the same as that of the fourth main surface 314 of the vertical section 311, that is, a radian of the cambered surface of the insulating body 11 is kept consistent with that of the stator tooth 31, and the second main surface 112 of the insulating body 11 remains tightly attached to the fourth main surface 314 of the stator tooth 31, thereby saving the space.

Figure 4:
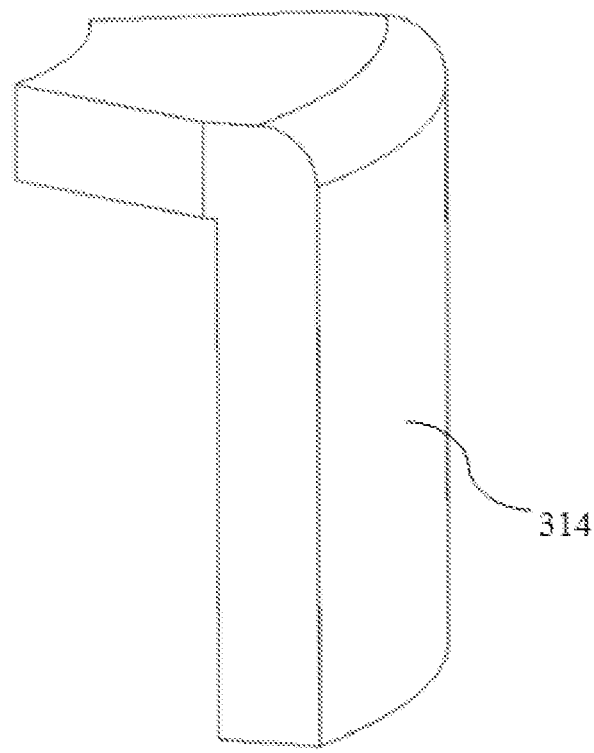
FIG. 4 illustrates a side view of a stator tooth according to an embodiment of the present disclosure.

The third main surface 313 of the stator tooth 31 is tightly attached to the first main surface 111 of the insulating body 11. When the first main surface 111 is a straight surface, it is a plane without obvious concave and convex parts. As illustrated in FIGS. 3 and 4, the third main surface 313 and the fourth main surface 314 are both concentric cambered structures. Viewed from a lateral side of the stator tooth 31, the third main surface 313 is a concave surface, the fourth main surface 314 is a convex surface, and the first main surface 111 of the insulating body 11 attached to the third main surface 313 is a straight surface, which can ensure that the coil 4 wound on the insulating body 11 is tightly attached to the first main surface 111 and is not prone to breakage or layer staggering, thereby meeting the winding condition. Meanwhile, when the first main surface 111 is a straight surface, it is possible to avoid the interference between the coil 4 and the rotor, and guarantee a certain clearance therebetween.

Figure 5:
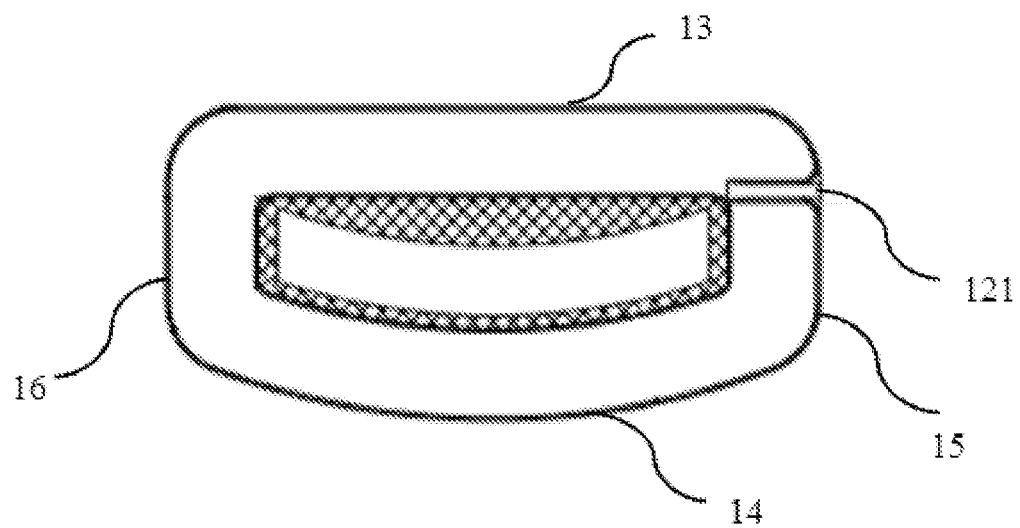
FIG. 5 illustrates a top view of an insulating framework according to an embodiment of the present disclosure.

Different from the 'tightly attached to' in other parts of the present disclosure, the 'tightly attached to' in 'the third main surface 313 of the stator tooth 31 is tightly attached to the first main surface 111 of the insulating body 11' may be understood as 'close to' or 'proximate to'. Specifically, as illustrated in FIGS. 3 and 5, in fact, the insulating body 11 has a first sidewall located at a relatively inner side and a second sidewall located at a relatively outer side. An inner surface of the first sidewall is attached to the third main surface 313 of the stator tooth 31, and an inner surface of the second sidewall is attached to the fourth main surface 314 of the stator tooth 31. Since the third main surface 313 and the fourth main surface 314 of the stator tooth 31 are both cambered surfaces, the inner surface of the first sidewall and the inner surface of the second sidewall are also correspondingly cambered surfaces. The 'first main surface 111' described in the present disclosure should be an outer surface of the first sidewall, which is a straight surface. Compared with the second main surface 112 (i.e., an outer surface of the second sidewall), the first main surface 111 is 'closer' or 'more proximate' to the third main surface 313.

In some possible embodiments, in order to keep the overall structure of the stator mechanism being compact, the first main surface 111 of the insulating body 11 may be a cambered surface with a same curvature as the third main surface 313. That is, viewed from a lateral side of the stator tooth 31, the first main surface 111 of the insulating body 11 formed on the stator tooth 31 is a concave surface, and the second main surface 112 is a convex surface. At this time, the coil 4 cannot be tightly attached to the first main surface 111, and the first main surface 111 has only two fulcrums for the coil 4. When the stator tooth 31 is mounted onto the stator yoke, the third main surface 313 of the stator tooth 31 faces the annular inner circumferential surface of the stator yoke, and the fourth main surface 314 of the stator tooth 31 faces away therefrom. Meanwhile, the first main surface 111 of the insulating body 11 faces the annular inner circumferential surface of the stator yoke, and the second main surface 112 faces away therefrom.

Figure 2:
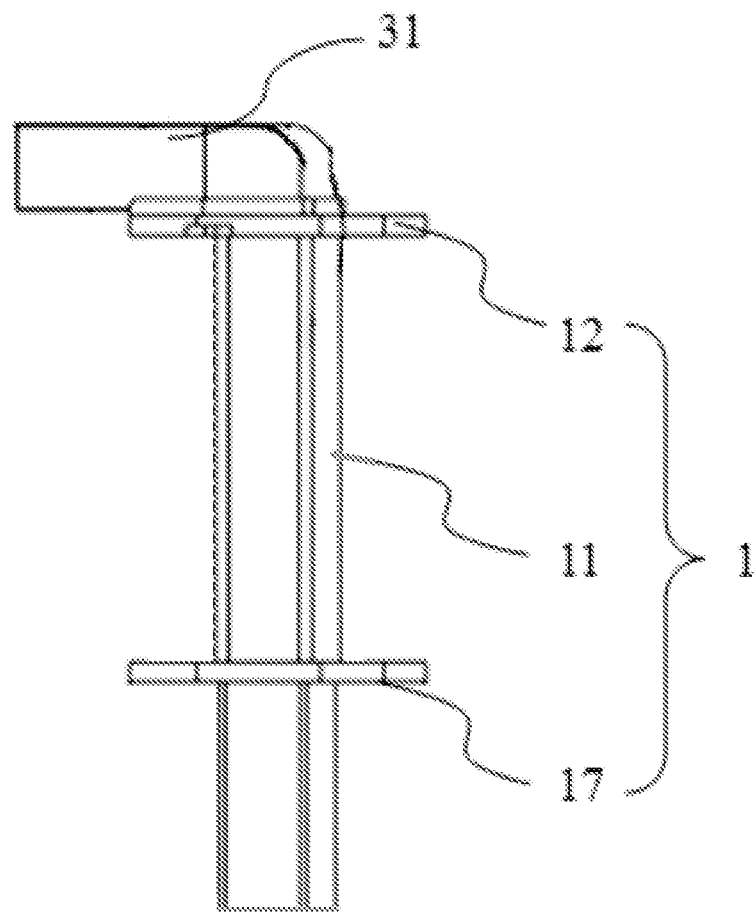
FIG. 2 illustrates a structural diagram of a stator mechanism (excluding a stator yoke) for a magnetic levitation motor according to an embodiment of the present disclosure.

As illustrated in FIGS. 2 and 3, the insulating framework 1 includes a first baffle 12 and a second baffle 17 substantially parallel to each other, and an insulating body 11 located between the first baffle 12 and the second baffle 17. The insulating framework 1 is overall and substantially shaped like a character "L"', and the coil 4 is transversely wound between the first baffle 12 and the second baffle 17.

After being unfolded, the coil 4 has two ends, namely a wire entry end and a wire exit end. In order to facilitate the fixing of the coil 4 to ensure the stability of the coil 4 wound on the insulating body 11, as illustrated in FIG. 5, the first baffle 12 or the second baffle 17 may be provided with a wire entry slot 121, and of course, both of the baffles may be provided with the wire entry slots 121. Specifically, the wire entry end of the coil 4 may be embedded in the wire entry slot 121, and then the remaining part of the coil 4 excluding the wire entry end may be wound on the insulating body 11 to ensure that the coil 4 has a certain tension during winding and will not be easily loosened.

When the magnetic levitation motor is mounted, both the insulating framework 1 and the stator mechanism are accommodated in a housing of the magnetic levitation motor. An internal space of the housing is compact, so if the coil 4 wound on the insulating framework 1 have a large number of layers, the coil 4 will be contacted with the housing of the magnetic levitation motor. If the windings are too saturated, the coil 4, when squeezed by the housing, will cause an air gap to be formed between the end of the stator tooth 31 and the stator yoke, resulting in uneven magnetic flux on the stator tooth 31.

Specifically, the insulating body 11 has a first end and a second end opposite to each other in a first extending direction. The first end is provided with a first baffle 12, and the second end is provided with a second baffle 17. Further, when projected in a direction parallel to the insulating body 11, the first baffle 12 and the second baffle 17 may have outer contour projections overlapped with each other, in which the insulating body 11 is located. In order to avoid the coil 4 from contacting the housing of the magnetic levitation motor, the coil 4 wound on the insulating body 11 will not protrude beyond maximum outer contour edges of the first baffle 12 and the second baffle 17.

In some embodiments, the first main surface 111 of the insulating body 11 is a straight surface and the second main surface 112 is a cambered surface, so that a distance between the first main surface 111 and the outer contour edge of the first baffle 12 or the second baffle 17 may be different from that between the second main surface 112 and the outer contour edge of the first baffle 12 or the second baffle 17. For example, if the distance between the second main surface 112 and the outer contour of the baffle is short, the coil 4 on the first main surface 111 is inside the outer contour edge of the baffle. In some exemplary embodiments, the distance between the first main surface 111 and the outer contour edge of the first baffle plate 12 or the second baffle plate 17 is the same as that between the second main surface 112 and the outer contour edge of the first baffle plate 12 or the second baffle plate 17, so that the material for manufacturing the insulating framework 1 can be saved and the space is more compact.

The insulating framework 1 provided in the present disclosure can maximize a slot filling rate. During wire arrangement, the wire entry end of the coil 4 may be manually embedded into the wire entry slot 121 of the first baffle 12 or the second baffle 17 to fix the copper wire, and then the remaining parts of the coil 4 excluding the wire entry end may be automatically wound on the insulating body 11 by an automation device.

In the present disclosure, the cross-section of the coil 4 is generally circular. When the coils 4 are wound on the insulating body 11, the first layer of the coil 4 has a largest number of turns. When the arrangement is continued upwards, in order to ensure that the coils 4 will not be loosened, it is preferable to wind a coil 4 in a gap between two turns of coil 4 of the previous layer of coils 4, so that the adjacent turns of coils of every two adjacent layers of coil form an equilateral triangular structure, which ensures that the coil arrangement has sufficient stability.

In the present disclosure, as illustrated in FIG. 5, each of the first baffle 12 and the second baffle 17 has a first side edge 13 corresponding to the first main surface 111, a second side edge 14 corresponding to the second main surface 112, and a third side edge 15 and a fourth side edge 16 located between the first side edge 13 and the second side edge 14. The second side edge 14 is a cambered edge protruding away from the first side edge 13, and a joint between the second side edge 14 and either of the third side edge 15 and the fourth side edge 16 is a rounded corner.

Further, a radian of the second side edge 14 may be the same as that of the second main surface 112 of the insulating body 11. The first side edge 13 may be a straight side edge corresponding to the first main surface 111. A distance between the second main surface 112 and a maximum outer contour of the second side edge 14 is the same as that between the first main surface 111 and the outer contour of the first side edge 13.

The insulating framework 1 and the stator tooth 31 may be in a nested assembly, and assembled after being formed separately. The two baffles of the insulating framework 1 are provided with openings for inserting the stator teeth 31, and the insulating body 11 of the insulating framework 1 is a hollow structure. When the stator tooth 31 is mounted in the insulating framework 1, there is a clearance between the outer surface of the stator tooth 31 and the hollow structure of the insulating body 11. As a result, if the wall thickness of the insulating body 11 is too small, the insulating framework 1 will be easily damaged due to its low strength when the coil 4 is tightly wound on the insulating body 11. Therefore, under this assembly mode, it is required that the insulating body 11 has a certain thickness.

The insulating framework 1 and the stator teeth 31 may also be assembled by means of interference fit. In this way, the insulating framework 1 and the stator tooth 31 should also be assembled after being formed separately. The two baffles of the insulating framework 1 are provided with openings for inserting the stator teeth 31, and the insulating body 11 of the insulating framework 1 is a hollow structure. When the stator tooth 31 is mounted in the insulating framework 1, there is no clearance between the outer surface of the stator tooth 31 and the hollow structure of the insulating body 11. Under this assembly mode, in order to ensure that the insulating framework 1 has an enough strength for mounting the stator tooth 31 therein, it is required that the insulating body 11 has a certain thickness.

The insulating framework 1 may also be connected to the stator tooth 31 through an adhesive portion, that is, there is an adhesive portion between the insulating body 11 and the vertical section 311. In some embodiments, the insulating framework 1 and the stator tooth 31, after being formed separately, may be provided with a filler therebetween, and the filler forms the adhesive portion, so that the insulating framework 1 and the stator tooth 31 are tightly attached to each other without a clearance therebetween.

In some embodiments, the adhesive portion is an adhesive surface formed on the vertical section 311 to connect the insulating body 11. The stator tooth 31 and the insulating body 11 may be bonded together by means of adhesive. In this way, there is no clearance between the insulating body 11 and the stator tooth 31, and the wall thickness of the insulating body 11 can be reduced. Since there is no clearance and the space is saved by the reduction of the wall thickness of the insulating body 11, it is possible to increase the number of layers of coils wound on the outer surface of the insulating body 11, thereby increasing the stacking density of the coils in a limited space.

In an exemplary embodiment, the insulating framework 1 is insert-molded on the outer surface of the stator tooth 31 to be integrally formed therewith. Therefore, the insulating framework 1 and the stator tooth 31 are tightly attached to each other without a clearance therebetween, and the wall thickness of the insulating framework 1 can be minimized, thereby increasing the winding space.

By insert-molding the insulating framework 1 on the outer surface of the vertical section 311 of the stator tooth 31, the thicknesses of the first baffle 12 and the second baffle 17 may also be reduced when the insulating framework 1 is manufactured, thereby increasing the distance between the first baffle 12 and the second baffle 17, i.e., increasing a length of the insulating body 11 along the first extending direction. Therefore, the number of turns of each layer of coil 4 can be increased during the winding to increase the slot filling rate of the coil 4. It should be noted that the thicknesses of the first baffle 12 and the second baffle 17 should not be too small, so as to prevent the first baffle 12 and the second baffle 17 from being deformed by a tension at the winding position after the winding is completed.

Specifically, as illustrated in FIG. 5, the insulating framework 1 is formed integrally with the stator tooth 31 by inserting the vertical section 311 of the stator tooth 31 into a mold, injecting resin into the mold, and then demolding after cooling to a certain temperature. The insert-molding is an existed process, and the insulating framework may be manufactured according to the designed mold structure, which will not be described in detail herein.

An embodiment of the present disclosure further provides a stator coil, including an insulating framework 1 and a coil 4. The insulating framework 1 includes an insulating body 11 having a first end and a second end opposite to each other in a first extending direction. The first end is provided with a first baffle 12, and the second end is provided with a second baffle 17. The insulating body 11 has a first main surface 111 and a second main surface 112 opposite to each other. The second main surface 112 is a cambered surface protruding away from the first main surface 111. The coil 4 is transversely wound on the first main surface 111 and the second main surface 112 and is tightly attached thereto.

The stator coil according to the embodiment of the present disclosure can solve the technical problems solved by the above embodiments, and correspondingly achieve the technical effects achieved by the above embodiments, and the details will not be repeated herein.

The stator mechanism for the magnetic levitation motor and the stator coil according to the embodiments of the present disclosure have the advantages and characteristics below:

1. The insulating framework has a special structure composed of a cambered surface and a straight surface, and a radian of the cambered surface is consistent with that of the stator tooth, so that the space is more compact. The design of the straight surface enables the coil to be tightly attached to the surface of the framework, so the coil is not prone to breakage, uneven alignment, wire staggering, or layer staggering.

2. The thickness of the insulating framework in the stator mechanism can be minimized to save space to increase the number of layers of the wound coils, thereby increasing the stacking density of the coils in a limited space. Meanwhile, the thicknesses of the upper and lower baffles of the insulating framework can be reduced to increase the number of turns of each layer of the wound coils. Therefore, it is possible to maximize both the number of layers of the wound coils and the number of turns of each layer of the wound coils, which meets the requirements for the total number of turns under a certain wire diameter, thereby solving the problem.

Those described above are just preferred embodiments of the present disclosure, rather than limitations thereto. Any insubstantial change or substitution made by those skilled in the art on the basis of the present disclosure should fall within the protection scope of the present disclosure.

What is claimed is:

1. A stator mechanism for a magnetic levitation motor, comprising a stator coil and a stator core, wherein
the stator core comprises a stator yoke and at least a pair of stator teeth, and each of the stator teeth comprises a vertical section contacted with the stator yoke; the stator yoke is an annular structure with an annular inner circumferential surface; the vertical section comprises a third main surface which is a cambered structure close to the annular inner circumferential surface;
the stator coil comprises an insulating framework and a coil, wherein the insulating framework comprises an insulating body disposed on an outer surface of the vertical section, and the insulating body has a first main surface and a second main surface opposite to each other; the first main surface is a straight surface close to the third main surface; the second main surface is a cambered surface protruding outwards away from the first main surface, and the coil is transversely wound on the first main surface and the second main surface and tightly attached thereto.

2. The stator mechanism according to claim 1, wherein thicknesses of any two points of the vertical section are equal.

3. The stator mechanism according to claim 1, wherein a curvature of the third main surface is the same as that of the annular inner circumferential surface.

4. The stator mechanism according to claim 1, wherein the third main surface is flush with the annular inner circumferential surface.

5. The stator mechanism according to claim 1, wherein the vertical section comprises a fourth main surface opposite to the third main surface, the third main surface and the fourth main surface are both concentric cambered structures, and a curvature of the fourth main surface is the same as that of the second main surface.

6. The stator mechanism according to claim 1, wherein the insulating framework is insert-molded on the outer surface of the vertical section.

7. The stator mechanism according to claim 1, wherein the insulating body has a first end and a second end opposite to each other in a first extending direction, the first end being provided with a first baffle, and the second end being provided with a second baffle;
each of the first baffle and the second baffle has a first side edge corresponding to the first main surface and a second side edge corresponding to the second main surface;
the first side edge is a straight edge, and the second side edge is a cambered edge protruding outwards away from the first side edge.

8. The stator mechanism of claim 7, wherein the coil does not protrude beyond maximum outer contour edges of the first baffle and the second baffle.

9. The stator mechanism according to claim 1, wherein a distance between the first main surface and an outer contour edge of the first baffle or the second baffle is the same as that between the second main surface and the outer contour edge of the first baffle or the second baffle.

10. A stator coil, comprising an insulating framework and a coil, wherein the insulating framework comprises an insulating body having a first main surface and a second main surface opposite to each other, the first main surface is a straight surface, the second main surface is a cambered surface protruding outwards away from the first main surface, and the coil is transversely wound on the first main surface and the second main surface and tightly attached thereto.

* * * * *